United States Patent [19]
Shinbori

[11] Patent Number: 4,661,000
[45] Date of Patent: Apr. 28, 1987

[54] LAYOUT DISPLAY DEVICE OF ELECTRONIC PRINTER

[75] Inventor: Yoshiaki Shinbori, Tokyo, Japan

[73] Assignee: Casio Computer Co., Ltd., Tokyo, Japan

[21] Appl. No.: 756,946

[22] Filed: Jul. 18, 1985

[30] Foreign Application Priority Data

Jul. 26, 1984 [JP] Japan ............................ 59-155791

[51] Int. Cl.[4] .................................. B41J 3/46
[52] U.S. Cl. ..................... 400/83; 400/705; 364/519
[58] Field of Search ............... 400/83, 64, 3, 705, 400/705.1, 705.2, 706, 342, 347, 303, 305; 364/519, 521, 900 MS File; 340/709, 789, 724

[56] References Cited

U.S. PATENT DOCUMENTS 4,348,738  9/1982  Grier et al. .................. 364/900
4,417,239  11/1983  Demke et al. ............... 400/83 X
4,497,589  2/1985  Figini ........................... 400/706

FOREIGN PATENT DOCUMENTS 137241   10/1979  Japan ........................... 400/303
57-134745  8/1982  Japan.
58-176739  10/1983  Japan.
2087115   5/1982  United Kingdom.
2090032   6/1982  United Kingdom ......... 400/83

OTHER PUBLICATIONS

D. T. Wang, IBM Tech. Disclosure Bull. (3/81), 4690–4691, "Boundary Checking Apparatus for Page Printers".

Primary Examiner—Charles A. Pearson
Attorney, Agent, or Firm—Frishauf, Holtz, Goodman & Woodward

[57] ABSTRACT

In a layout display device of an electronic printer, a per character display segment number is calculated by a CPU in accordance with a total display segment number of the layout display section and possible printing range data, and an input character number is multiplied with the calculated value to thereby turn on the display segments of the section corresponding to the input character number.

4 Claims, 18 Drawing Figures

LAYOUT DISPLAY DEVICE OF ELECTRONIC PRINTER

BACKGROUND OF THE INVENTION

The present invention relates to an improvement of the layout display device of an electronic printer, whereby display segments can be effectively utilized.

Various types of portable electronic typewriters and wordprocessors with 16 character per line display sections have recently been developed wherein positions of characters sequentially entered on a line to be printed are displayed on an LCD layout display section provided separately from the character display section. Segment electrodes whose number is the same as that of the maximum number of characters which can be printed within one line are linearly arranged in the layerout display section. The segment electrodes corresponding to the number of input characrters for one line are driven and flickered, thereby indicating the current cursor position on the line. An operator can visually check the current cursor position by observing a flickering position in the layout display section. Furthermore, the operator can check which line on a page is currently being printed.

In the layout display section, however, since the number of display segments is predetermined, some specific display segments are never used in accordance with differences of pitches between the characters to be printed for one line, and line pitches between the lines to be printed on one page. Therefore, the entire display screen of the layout display section cannot be effectively utilized.

In a conventional electronic typewriter, for example, one of a character pitch mode for allowing either an input of a maximum of 96 characters or a character pitch mode for allowing an input of a maximum of 80 characters is selected, printing being performed in the selected mode. Such an electronic typewriter normally has a layout display section with 96 segments which correspond to a maximum printing character number of 96. When the 80-character pitch mode is set, after printing is completed in the 96-character pitch mode, display segments corresponding to 16 characters at either side of the screen are not driven at all. All the display segments cannot, therefore, be effectively utilized.

The above inconvenience also occurs when sheet size is changed. When a wide sheet is replaced with a narrow sheet, a blank is formed on the layout display section after the sheet size is changed if the character size and pitch remain the same. As a result, some display segments are not utilized.

When the line pitch is changed while the same sheet size is employed, a blank portion is formed on the layout display screen after the line pitch is, for example, decreased. As a result, again some display segments cannot be utilized, resulting in inconvenience.

SUMMARY OF THE INVENTION

It is an object of the present invention to provide a layout device for an electronic printer wherein all display segments are effectively utilized.

In order to achieve the above object of the present invention, there is provided a layout display device comprising keyboard means having at least character keys; layout display means having a plurality of fixed display segments arranged in a given manner; means for setting one of a maximum character number and a maximum line number; first memory means coupled to the setting means for storing maximum number data representing said one of said maximum character number and maximum line number; means coupled to the keyboard means for determining positions of characters printed on the recording sheet by depression of the character keys; second memory means coupled to the character position determining means for storing character position data representing the determined character positions; arithmetic means coupled to the first and second memory means for calculating display segment position data to the total number of said display segments of the layout display means is equal to the ratio of said character position data to said maximum number data; and layout display control means coupled between the arithmetic means and the layout display means for displaying the display segments at that position on the layout display section which corrsponds to the data of display segment position.

This being the arrangement of the layout display device of the electronic printer according to the present invention, the entire screen of the layout display can be effectively utilized by proportionating the input numeral data regardless as to whether or not the character pitch, the line pitch, or the sheet size is changed, thereby improving readability at the layout display.

DETAILED DESCRIPTION OF THE PREFERRED EMBODIMENTS

Figure 1:
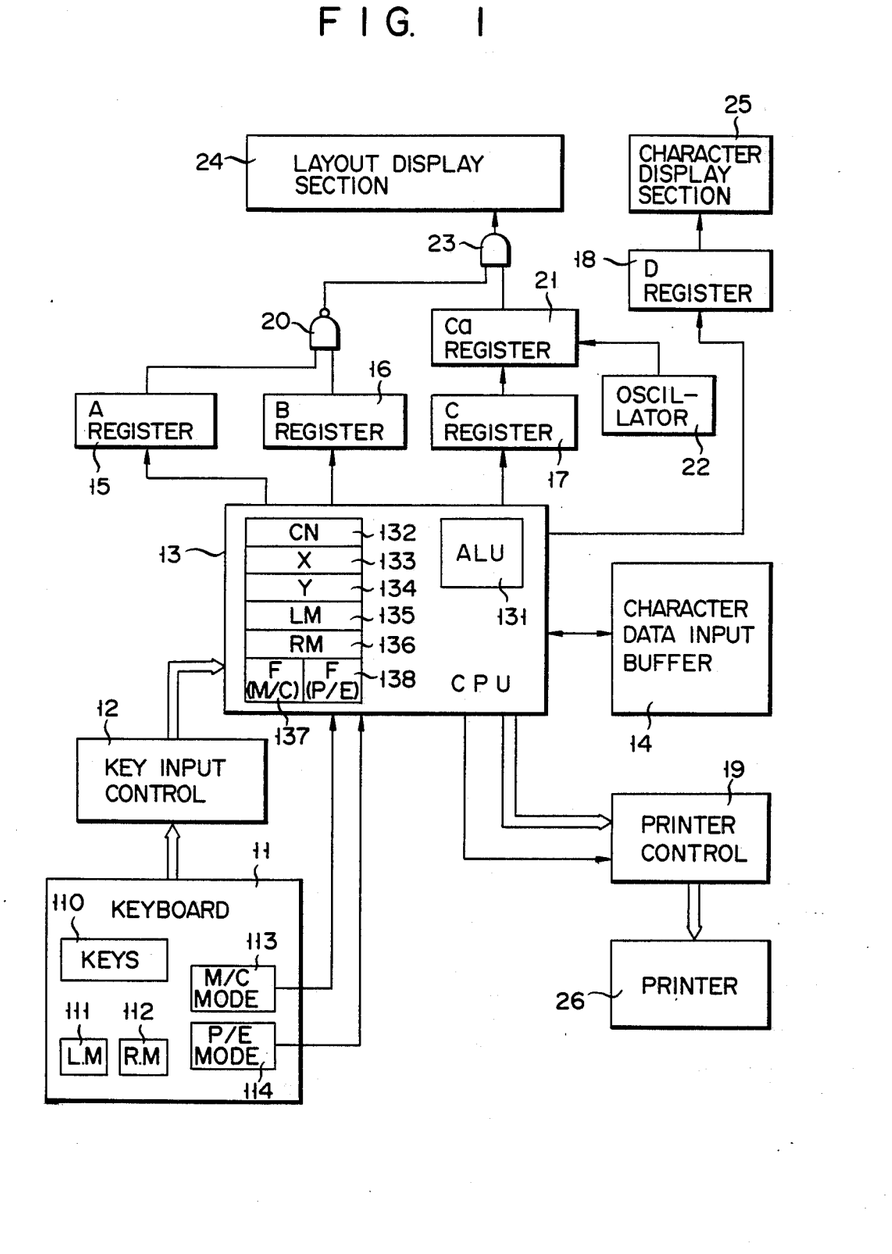
FIG. 1 is a block diagram of a layout display device according to an embodiment of the present invention.

A preferred embodiment will be described with reference to the accompanying drawings. FIG. 1 shows the circuit arrangement of a portable electronic typewriter. The keyboard 11 has normal letter and numeral keys 110, a left margin key 111, a right margin key 112, a mode switch 113 for designating one of a margin set mode and a character input mode, and a mode switch 114 for selecting one of a "P" (pica) mode, i.e., a mode for allowing a maximum of 80 characters to be input for one line, and an "E" (elite) mode, i.e., a mode for allowing a maximum of 96 characters to be input for one line. That is, the mode switch 114 comprises a means for setting a maximum number of characters to be printed for one line on a recording sheet (i.e. a maximum character number).

By operating these keys, document data is entered into a key input control section 12 which discriminates as to which key is depressed. A discrimination result is supplied to a CPU 13 (i.e., arithmetic means) so that control operation is performed in accordance with data supplied from the control section 12. The CPU 13 includes registers 132, 133, 134, 135, 136, 137 and 138. The character number register 132 stores maximum character number data (CN) representing a maximum print enable character number, e.g., 96 characters in the "E" mode, or 80 characters in the "P" mode. The X register 133 stores character position data (x) representing a character position on one line of a recording sheet, and input character position data. The register 132 forms part of a first memory means, and the X register 133 forms part of a second memory means. The Y register 134 stores the display segment position data of the layout display section which corresponds to the position data stored in the X register 133. The left margin register 135 stores the left margin designation position data which is manually designated. The right margin register 136 stores the right margin designation position data which is manually designated. The flag register 137 stores a flag representing one of the margin set mode and the character input mode upon operation of the switch 113. More particularly, when the margin set mode is designated, the flag is set at logic "1". However, when the character input mode is designated, the flag is set at logic "0". The flag register 138 stores a flag for representing one of the "P" or "E" modes upon operation of the switch 114. When the "P" mode is designated, the flag is set at logic "1". However, when the "E" mode is designated, the flag is set at logic "0".

The CPU 13 controls both arithmetic and logic operations by these registers, and an arithmetic and logic unit (ALU) 131 in accordance with the data entered from the control section 12.

A margin/character switching signal from the switch 113 in the keyboard 11 is supplied to the CPU 13. A "P"/"E" mode switching signal from the switch 114 is supplied to the CPU 13. The CPU 13 is connected to an input character buffer 14 for temporarily storing input character data. The CPU 13 is also connected to an A register 15 for storing bit data which determines the left margin position of a layout display section 24, a B register 16 for storing bit data which determines the right margin position of the layout display section 24, a C register 17 for storing bit unit data representing a character position of the layout display section 24, a D register 18 for storing character data for causing a character display section 25 to display the character data, and a printer control 19. The bit data stored in the registers 15 and 16 are supplied to a NAND gate 20. The bit data stored in the register 17 is supplied to a Ca register 21 to which an oscillator 22 is connected. The Ca register 21 stores, as periodic blanking data of "0", "1", "0", "1" . . . bit unit, data "1" supplied from the register 17. The storage content of the Ca register 21 is read out and supplied to an AND gate 23. The AND gate 23 receives outputs from the NAND gate 20 and the Ca register 21, and supplies a logic product to the layout display section 24. The registers 17 and 21, and the AND gate 23 comprise a layout display control means. The layout display section 24 has 120 segment electrodes aligned in line, and displays a layout of character input states in accordance with the data supplied from the AND gate 23. The D register 18 stores 12-digit data corresponding to 12 characters. The control 19 receives the mode switching signals representing the character data and the P or E mode, respectively, supplied from the CPU 13. A printer 26 is controlled by the character data and the mode switching signal. The printer 26 is operated to print the character data in the "P" or "E" mode.

The operation of the circuit described above will be described with reference to FIGS. 2 to 4 and FIG. 5.

Figure 2:
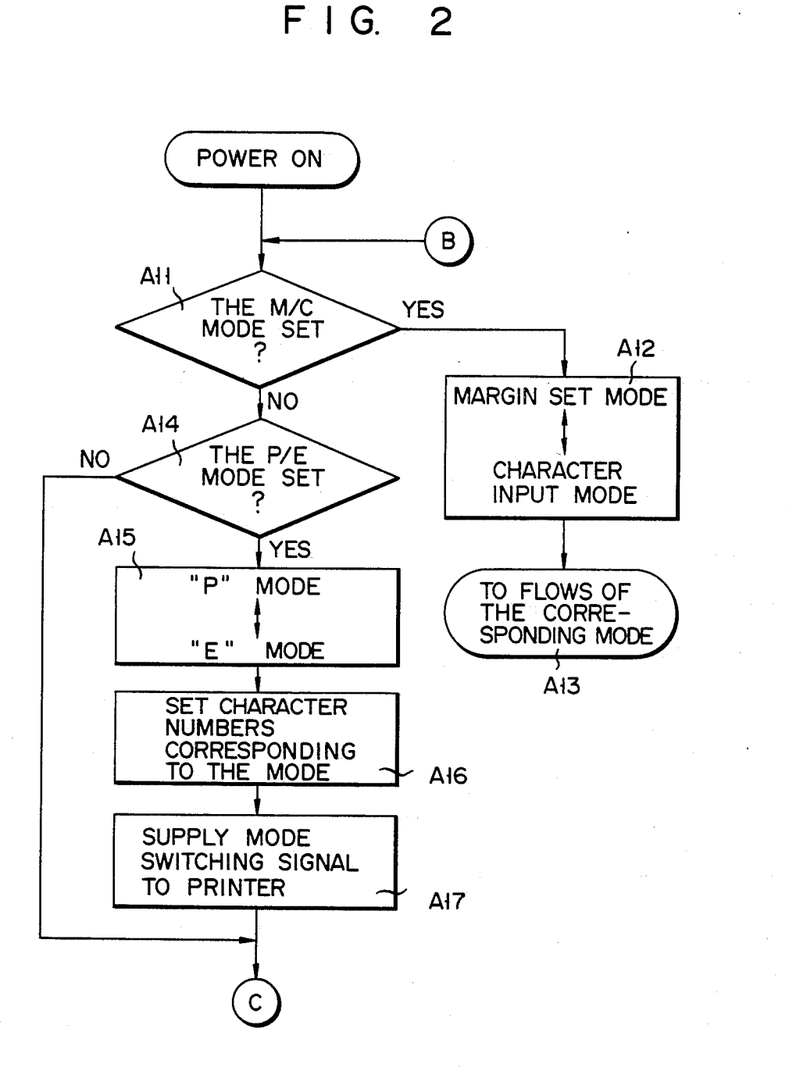
FIG. 2 is a flow chart for explaining power-on operation in the device of FIG. 1.
Figure 4:
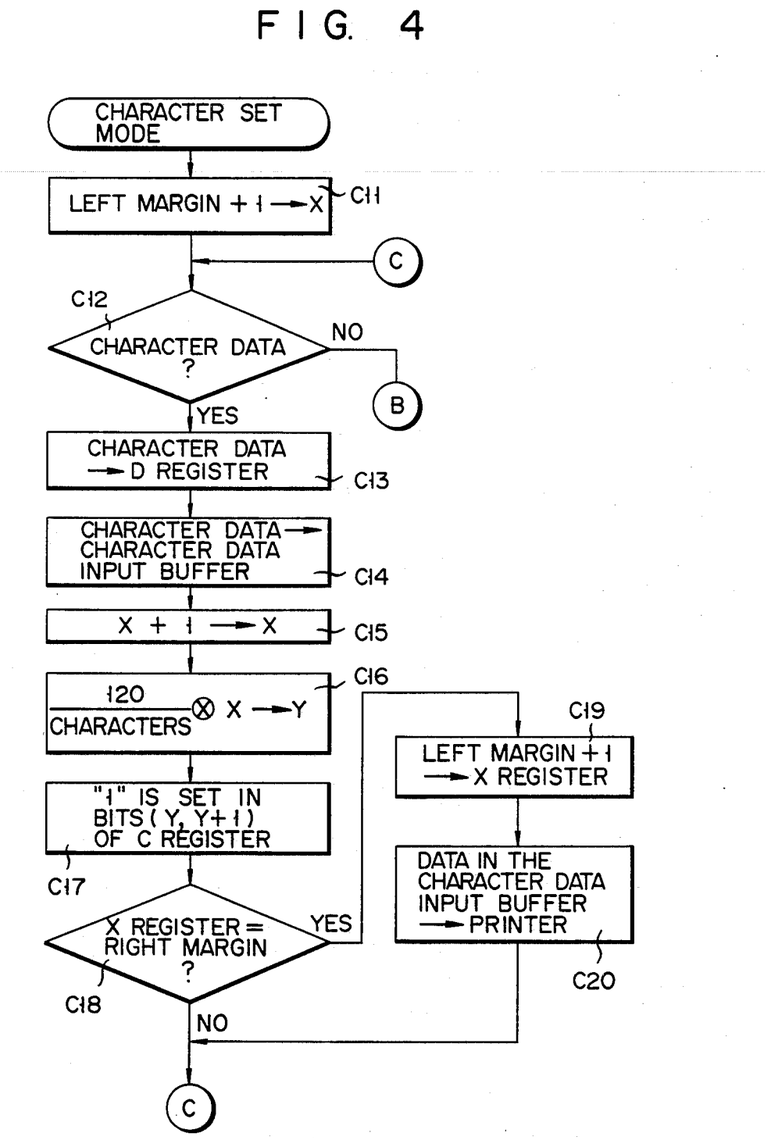
FIG. 4 is a flow chart for explaining the operation of a character input mode in the layout display device.

Referring to the flow chart of FIG. 2, the CPU 13 checks, prior to the power-on operation, to ascertain as to whether the margin set mode or the character input mode is set by the switch 113. The CPU 13 also checks whether the "P" or "E" mode is set by the switch 114. Assume that the switch 113 sets the character input mode, and the switch 114 sets the "P" mode. Data "80" is stored in the character number register 132, data "0" is stored in the register 137, and data "1" is stored in the flag register 138. Under these conditions, the device is powered. In step A11 in the flow chart of FIG. 2, the CPU 13 determines that the M/C mode is not switched, and the flow advances to step A14. Since the device has just been powered, the CPU 13 determines, in step A14, that no switching of the P/E mode is performed. A character input mode of FIG. 4 is then initiated. In other words, the flow advances to step C12.

Figure 3:
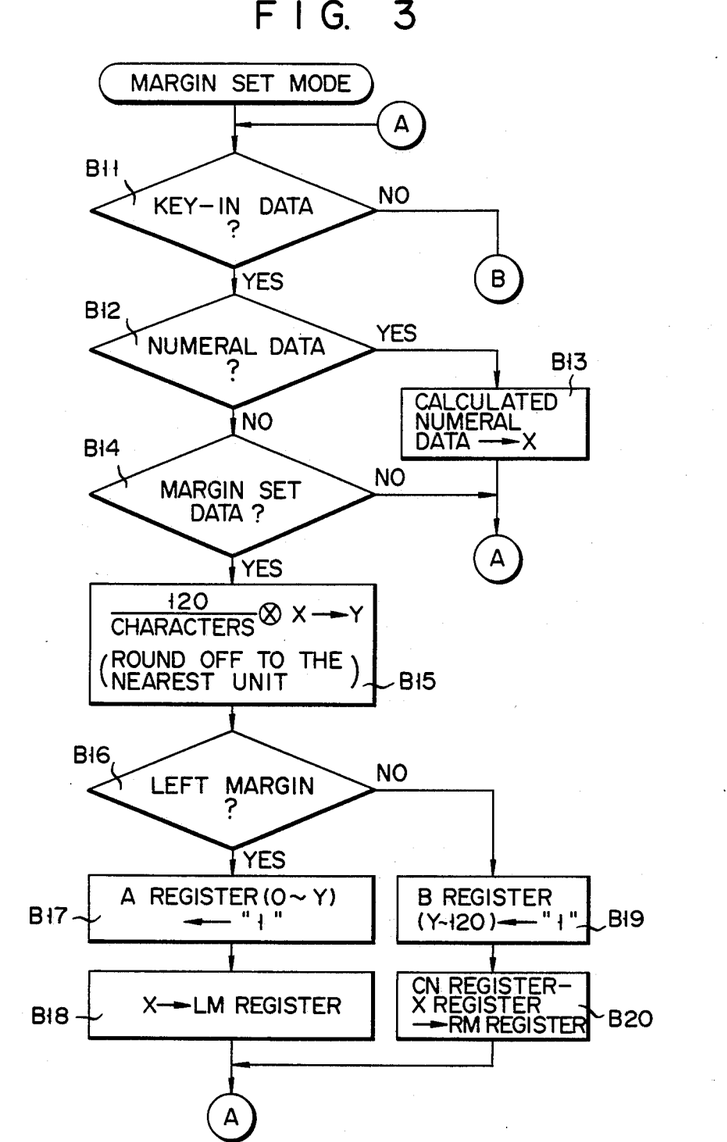
FIG. 3 is a flow chart for explaining the operation of a margin set mode in the layout display device.

When the device is powered, the CPU 13 checks, in step A11, whether or not the M/C mode is switched by the switch 113. If YES in step A11, the flow advances to step A12 wherein the storage content of the register 137 is updated. More particularly, when the storage content is "0" in the character input mode, the content is updated to "1", representing the margin set mode. However, when the storage content is set in "1", representing the margin set mode, the content is updated to "0", representing the character input mode. Thereafter, the flow advances to step A13 and the operation of one of the flows of FIGS. 3 and 4 is started.

The CPU 13 checks, in step A14, whether or not P/E mode is switched by the switch 114. If YES in step A14, the flow advances to step A15 to update the storage content of the flag register 138. More particularly, when "0", representing the "E" mode, is stored in the flag register 138, the content is updated to "1", representing the "P" mode. However, when the content is "1", it is updated to "0". The flow advances to step A16 and data of maximum character number (i.e., "80" in the "P" mode, by "96" in the "E" mode) of one line is set in the character number register 132 in step A16. Thereafter, the flow advances to step A17 and a mode signal corresponding to the new mode is supplied to the control 19, thereby changing the printer specifications, i.e., the maximum number of characters for one line. The flow advances to step C12 of FIG. 4 in a character input mode operation (to be described later). However, if NO in step A14, the flow advances to step C12 of the character input mode.

The mode of operation will be described with reference to FIG. 3, wherein the margin set mode is selected.

In the margin set mode, character numbers corresponding to the left and right margins of the recording sheet are set to perform layout display of the margins. The CPU 13 checks, in step B11, whether or not key operation is performed. If NO in step B11, the flow advances to step A11 of FIG. 2. However, if YES in step B11, the flow advances to step B12. The CPU 13 checks, in step B12, whether or not the depressed key is a numeral key representing a character number of the margin position. If YES in step B12, numeral processing, e.g., rounding, is performed in step B13 to obtain a character number for determining the margin position, the resultant value being stored in the X register 133. Thereafter, the flow returns to step B11. When the CPU 13 determines, in step B12, that the depressed key is not a numeral key, the CPU 13 checks, in step B14, whether the depressed key is the key 111 or 112. If the CPU 13 determines that the depressed key is not a margin key, the flow returns again to step B11. The CPU 13 again checks, in step B11, whether the key operation is present/absent.

When the CPU 13 determines that the depressed key is one of the right and left margin keys, however, the flow advances to step B15 wherein the proportional assignment value (i.e., rounding to the nearest unit) of the display dots in the layout display section 24 is calculated. This operation is as follows. "120", as the total segment number of the section 24, is divided by a value which is stored in the character number register 132 (forming part of the first memory means) for storing the maximum one-line character number data corresponding to the selected mode so that the number of segment electrodes per one character is determined. The resultant value is multiplied with the character position data (X) which determines the margin and stored in the X register 133 (forming part of the second memory means) in step B13. The multiplied result is rounded to the nearest unit and the rounded result is stored in the Y register 134. When the proportional assignment value is obtained in step B15, the CPU 13 checks, in step B16, whether or not the depressed margin key is the key 111. If YES in step B16, the value "Y", as the proportional assignment value, is read out from the Y register 134. In step B17, bit data of logic "1" are written, in order, into the 0th bit area to the Yth bit area of the A register 15. In step B18, the content of the X register 133, i.e., the numeral data entered in step B13, is written into the left margin register 135, and the flow returns to step B11. However, if NO in step B16, it indicates that the right margin key 112 is depressed. In this case, bit data of logic "1" are written in corresponding bits from the 120th bit area to the lower bit areas, respectively, of the B register 16 in step B15. In step B20, a value obtained by subtracting the content of the X register 133 from the content of the character number register 132 for storing the maximum number of characters which can be be printed within one-line is written as the right margin, as counted from the left end in the right margin register 136. Thereafter, the flow returns to step B11.

The mode of operation will be described with reference to FIG. 4 wherein the character input mode is selected.

"1" is added to the left margin designation character number stored in the left margin register 135 in step C11, and a resultant sum is stored in the X register 133 to determine the first character position data. The CPU 13 checks, in step C12, whether or not a character key is depressed. If NO in step C12, the operation is performed in accordance with the flow from step A11 of FIG. 2. However, if YES in step C12, the flow advances to step C13. Character data corresponding to the depressed character key is supplied to the D register 18 through the CPU 13. The character data is also stored in the input character buffer 14, as shown in step C14. In step C15, data "1" is added to the content of the X register 133, and a resultant sum is stored in the X register 133. In order to perform layout display corresponding to the input character position, the proportional assignment number of the display dots of the layout display section 24 is calculated in step C16, the calculation principle in step C16 being the same as that in step B15. The calculation result is stored as the bit number data "Y" in the Y register 134. The number data "Y", read out from the Y register 134, is written as bit data of logic "1" in the Yth bit area and (Y+1)th bit area of the C register 17 in step C17. This indicates that one-bit data from the Y register 134 is stored as two-bit data in the C register 17. The CPU 13 checks, in step C18, whether or not the contents of the X register 133 for storing the character position data is equal to the data stored in the right margin register 136. This determination is performed to check whether or not one-line character input is completed. If no coincidence between the contents of the X register 133 and the right margin register 136 is established, the operations from step C12 are repeated. However, when a coincidence is established, the CPU 13 determines that one-line character data is already entered, and the flow advances to step C19. In order to start the character input of the next line, "1" is added to the content of the left margin register 135 in step C19. The sum is stored in the X register 133. Thereafter, the flow advances to step C20 and the one-line character data stored in the input character buffer 14 is supplied to the control 19, thereby performing printing. When one-line printing is completed, the storage content of the input character buffer 14 is cleared and the flow returns to step C12 to input the character data of the next line.

Figure 5:
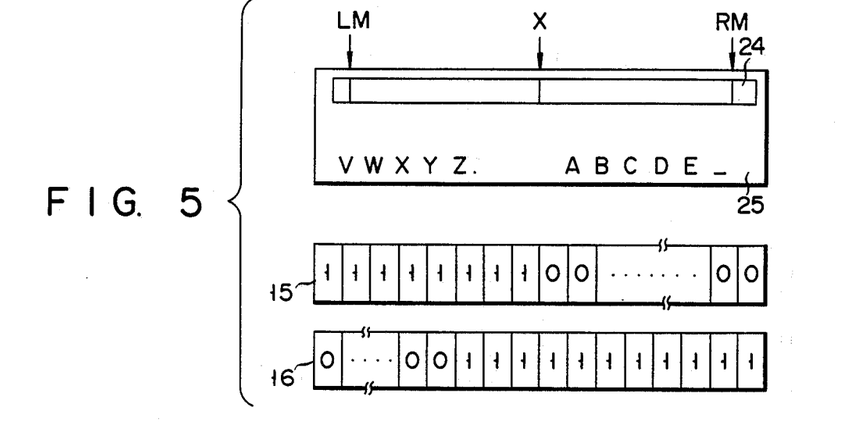
FIG. 5 is a data format of registers for storing margin data of one line in a given mode.

FIG. 5 shows a display state of the layout display section 24 wherein the 33rd character from the first character position is about to be entered when the "P" mode is set, and the left and right margins are set for 5 and 7 characters, respectively. The left margin is $(120/80) \times 5 = 7.5 \approx 8$ in accordance with the proportional assignment value calculation in step B15 of FIG. 3. In step B17, data of logic "1" are stored, in order, in the 0th bit area to the 8th bit area of the A register 15. Similarly, the right margin is calculated such that $(120/80) \times 7 = 10.5 \approx 11$, with data of logic "1" being stored, in order, from the 120th bit area to the 110th bit area downward. In this manner, the left and right margin designation character numbers corresponding to the maximum character display number of the layout display section 24 are determined.

The right and left blank portions of the layout display section 24 are, therefore, proportionally determined. For example, when the 33rd character position is indicated on the layout display section 24, the content of the X register 133 is "38". Therefore, the proportional assignment value in step C16 of FIG. 4 is calculated such that $(120/80) \times 38 = 57$. The data of logic "1" are stored in the 57th and 58th bits of the C register 17 in step C17. The data "1", "1" are periodically reset upon operation of the oscillator 22, and the 57th and 58th bits of the layout display section 24 flicker.

Figure 6:
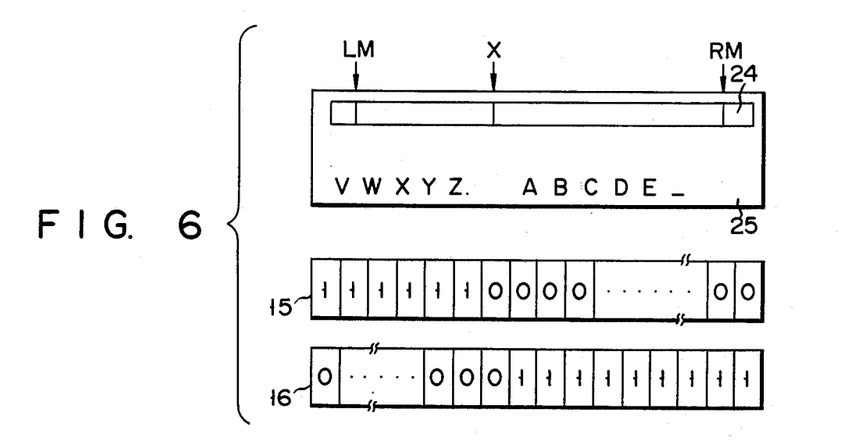
FIG. 6 is a data format of the registers for storing margin data of one line in a mode different from the given mode of FIG. 5.

Similarly, FIG. 6 shows a layout display state of the character input when the "E" mode is selected. The left margin is calculated such that $(120/96) \times 5 = 6.25 \approx 6$ in accordance with the proportional assignment value calculation in step B15. Data of logic "1" are stored, in order, in the 0th to 6th bits of the A register 15. Similarly, the right margin is calculated such that $(120/96) \times 7 = 8.75 \approx 9$, and the data of logic "1" are stored, in order, in the 120th bit to the 111th bit of the B register 16, thereby determining the right margin position. As a result, in the layout display section 24, margin positioning representing the left margin as 6 bits and the right margin as 9 bits is performed, thereby displaying blank portions. In this case, for the layout display before the 33rd character is entered, the proportional assignment value calculation is performed in step C16 such that $(120/96) \times 38 = 47.5 \approx 48$, so that dots corresponding to the 48th and 49th bits of the C register 17 flicker.

In the above embodiment, the possible printing ranges are given as 80 haracters in the "P" mode and 96 characters in the "E" mode. However, the possible range can be arbitrarily determined in accordance with the desired printing modes.

Additionally, in the above embodiment, one-line display is exemplified. However, layout display for a plurality of lines with different line pitches, or for one page, can be performed. In addition, the layout display can be applied even when the sheet size is changed.

Figure 7:
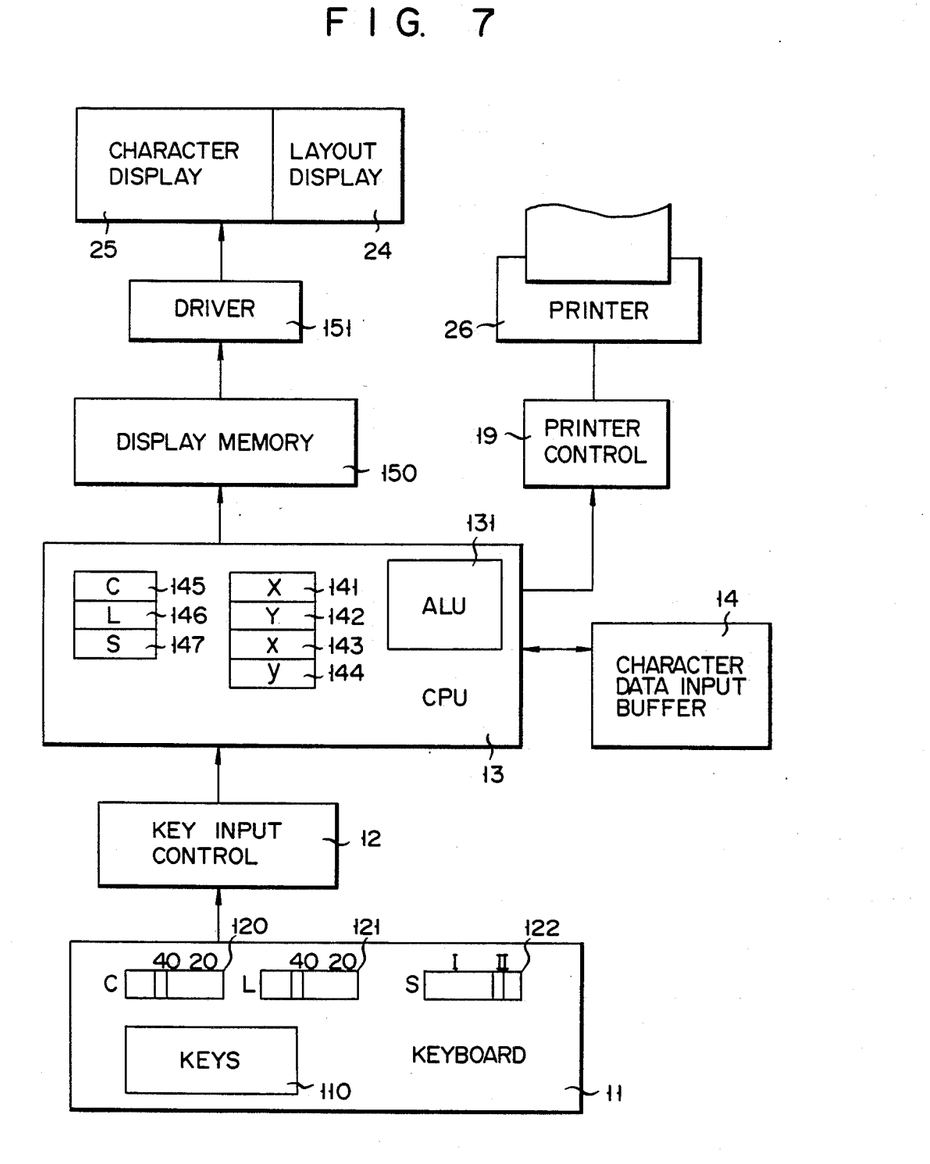
FIG. 7 is a block diagram of a circuit for allowing a character or pitch change, and a sheet size change according to another embodiment of the present invention.
Figure 8:
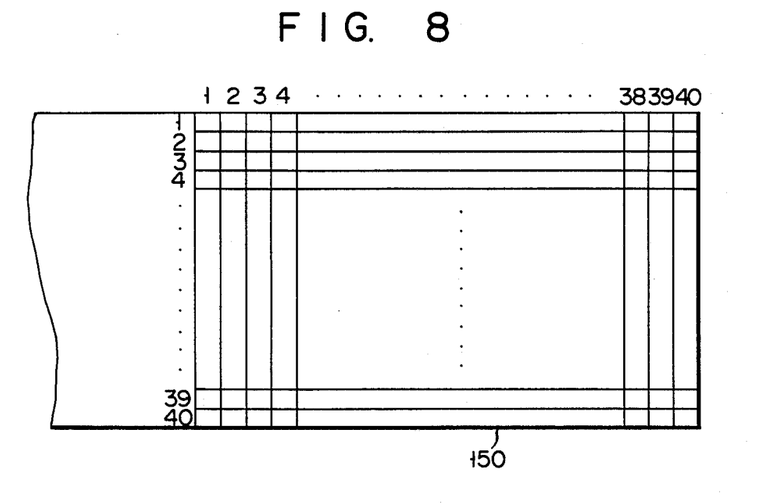
FIG. 8 is a diagram showing a segment arrangement in the display memory shown in FIG. 7.

FIG. 7 is a block diagram of a circuit for performing an optimal layout display when either the character, the line pitch, or the sheet size is changed according to another embodiment of the present invention. The keyboard 11 has normal letter and numeral keys 110, and also has a switch 122 for selecting one of different sheet sizes I and II, a column switch 120 for selecting that the maximum character number (column number) for one line is 40 or 20, and a line switch 121 for selecting that the maximum line number (row number) of one page is "40" or "20". Key operation data is supplied to a key input control section 12 which determines the key depressed. This discrimination result is supplied to a CPU 13 which performs a predetermined control in accordance with the input data. The CPU 13 includes an X register 141 for storing column position data (x) representing column position on one page of a recording sheet, a Y register 142 for storing, as bit data, the display segment position of a matrix layout display section 24 corresponding to the data stored in the register 141, an x register 143 for storing row position data (x) representing row position on one page of a recording sheet, a y register 144 for storing, as bit data, the display segment position of the matrix layout display section 24 corresponding to the data stored in the x register 143, a C register 145 for storing a selected maximum character number for one line, an L register 146 for storing the selected maximum line number of one page and an S register 147 for storing a selected sheet size. The C register 145 and/or the L register 146 comprise part of the first memory means. The register 141 and/or the x register 143 comprise part of the second memory means. The CPU 13 performs arithmetic control by these registers and by an arithmetic and logic unit (ALU) 131, in accordance with the data entered to the key input control section 12. The CPU 13 is connected to an input character buffer 14 which temporarily stores the input character data. The CPU 13 is also connected to a printer control section 19 so that the input character data is printed at a printer 26 through the printer control section 19. The calculated data and the input data in the CPU 13 are displayed at a character display 25 through a display memory 150 and a driver 151. At the same time, layout display is performed on a matrix layout display section 24 on the basis of the calculated data. The display memory 150 has a memory area of a $40 \times 40$ matrix corresponding to the size II, as shown in FIG. 8. The size I, selected by the switch 122 in the keyboard 11, can be printed with 20 characters for one line and 20 lines. The size II can be printed with 40 characters for one line and 40 lines. Upon selection of the size I or II, the switches 120 and 121 are set at the "20" or "40" position, respectively, thereby selecting the maximum character number for one line and the maximum line number of one page.

Figure 9:
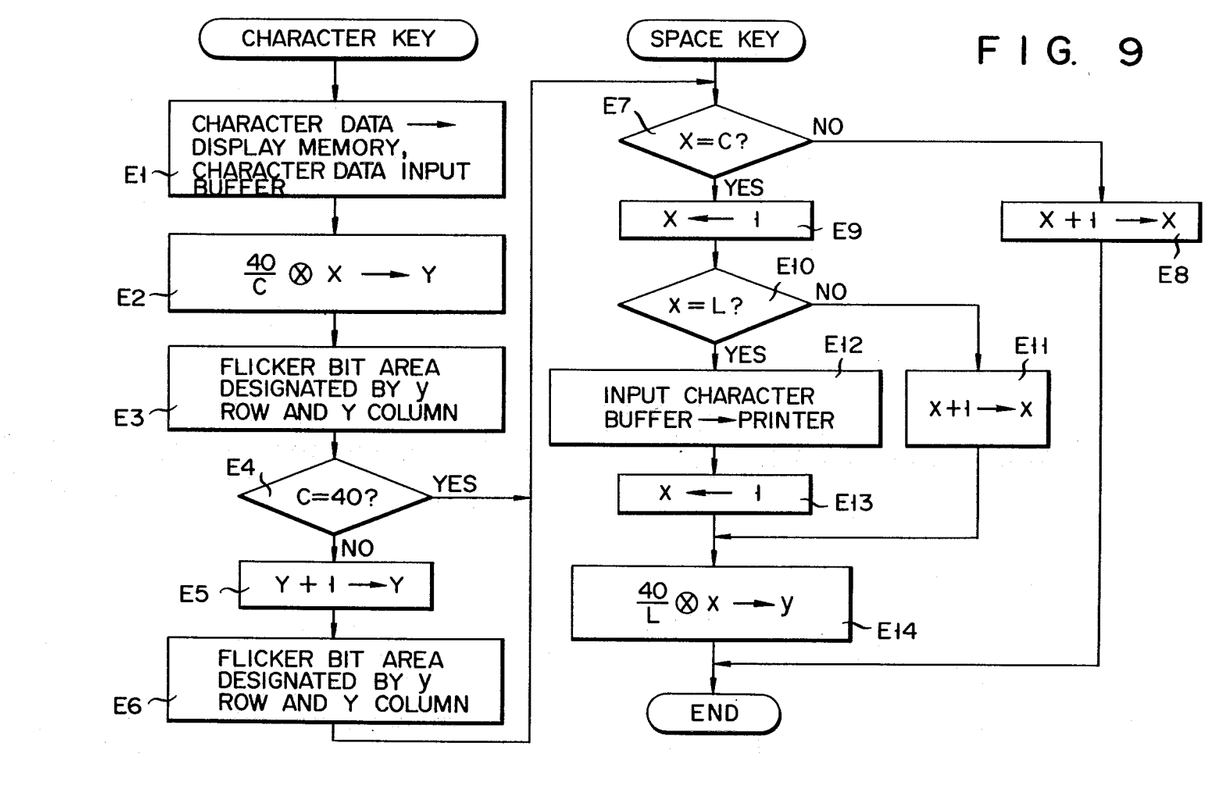
FIG. 9 is a flow chart for explaining the operation when the layout display is performed as a matrix display.

A matrix layout display will be described with reference to FIG. 9 wherein the character and space keys are used.

When a character key is depressed, the corresponding character data is supplied to the memory 150 and the input character buffer 14 of FIG. 7, in step E1. The flow advances from step E1 to step E2. The bit number Y, on the display 24, is calculated such that $40/C \times X = Y$, where "40" is the total number of display segments for one line of the matrix layout display section 24. The flow advances to step E3, a dot of yth row (i.e., the first line) Yth column is designated, and the corresponding dot is turned on. In step E4, the CPU 13 checks whether the switch 120 is set in the "40" or "20" position. If the CPU 13 determines that the switch 120 is not set in the "40" position, the flow advances to step E5. "Y+1", for correcting the proportional assignment number of the display area so as to correspond to the column number "20", is updated as the corrected value "Y". The bit (dot) area designated by the yth row and the Yth column is turned on in step E6. When the CPU 13 determines that the column number is "40", the flow advances to step E7 when the lighting flow for the column number of "20", in step E6, is completed, and the space key is depressed. The CPU 13 checks, in step E7, whether or not the column position data X has reached the data of preset column number C. If NO in step E7, the flow advances to step E8 where "1" is added to the column position data X. When the column position data has reached the right end of a line, the flow advances to step E9 and a line return is performed whereby the column position data is recounted from "1". Line returns are then sequentially repeated with the CPU 13 checking, in step E10, whether or not the row position data x has reached the data of preset line number L. If NO in step E10, the flow advances to step E11, and the row position data x is incremented one by one. When printing progresses, and the CPU 13 determines that the row position data x has reached the preset line number L, the storage content of the input character buffer 14 is supplied to and printed at the printer 26 in step E12. When the preset page printing is completed, the printing start state in step E13 is restored. The display of lines of the line number L on the layout display section 24 is performed such that the value y is given as $40/L \times x = y$, where "40" is the total number of the display segments for one column of the matrix layout display section 24. In this manner, the layout display can perform a matrix display wherein the row and column dots flicker.

Figure 10:
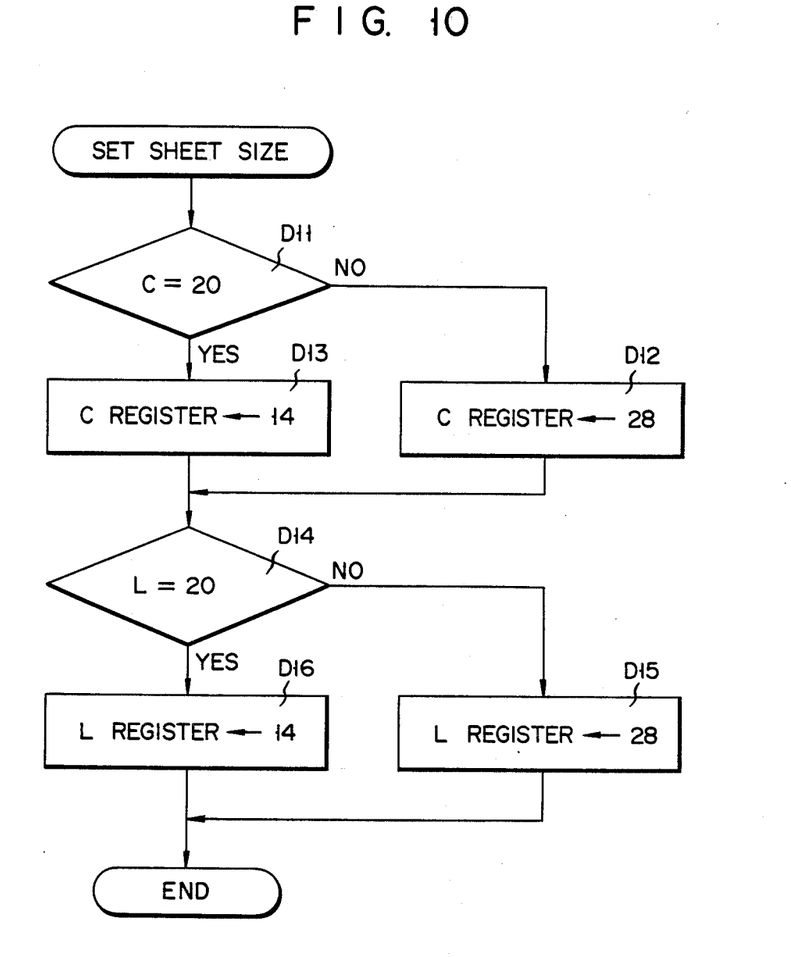
FIG. 10 is a flow chart for explaining the operation of a CPU of the circuit of FIG. 7 when sheet size is changed.

FIG. 10 is a flow chart for explaining how the registers of the CPU 13 are reset for the selected "row" and "column" numbers when the sheet size is changed, though the character pitch be left unchanged upon operation of the switch 122 in the circuit of the diagram shown in FIG. 7.

Figure 11A:
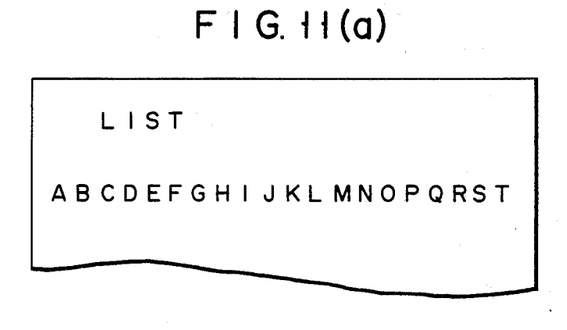
FIGS. 11(a) and 11(b) are representations showing printed letters on a sheet of a selected size, and the layout, respectively.
Figure 11B:
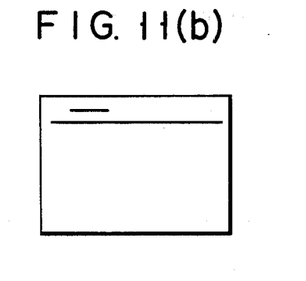
Figure 12A:
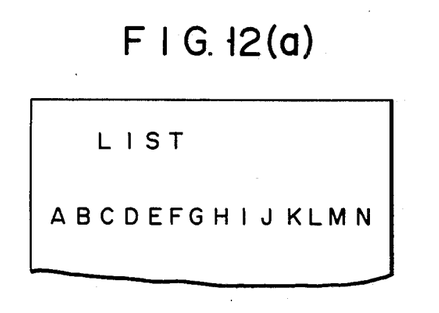
FIGS. 12(a) and 12(b) are representations showing printed letters on a sheet having a size different from that of the sheet of FIGS. 11(a) and (11b), and the layout, respectively.
Figure 12B:
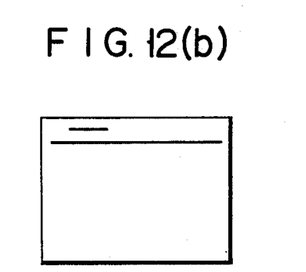
Figure 13A:
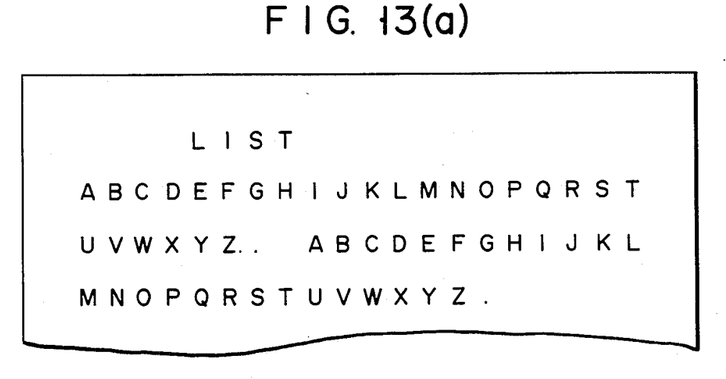
FIGS. 13(a) and 13(b) are, respectively, representations showing printed letters and the layout when a given character pitch is selected.
Figure 13B:
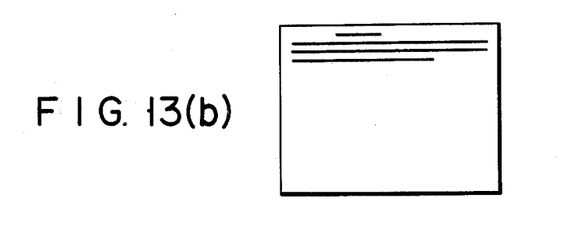
Figure 14A:
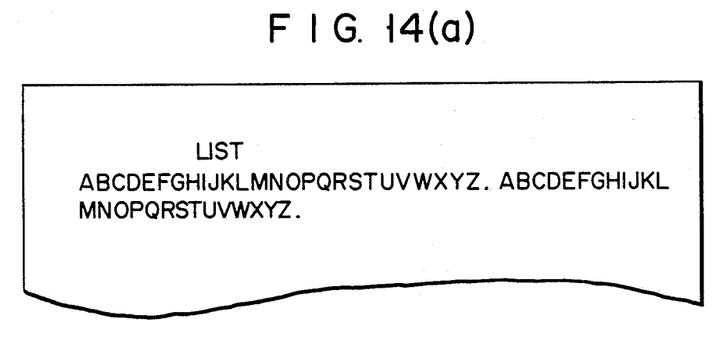
FIGS. 14(a) and 14(b) are representations showing printed letters and the layout when the same sheet size as in FIG. 13(a) is used, but when the character and line pitches differ from those of FIGS. 13(a) and 13(b).
Figure 14B:
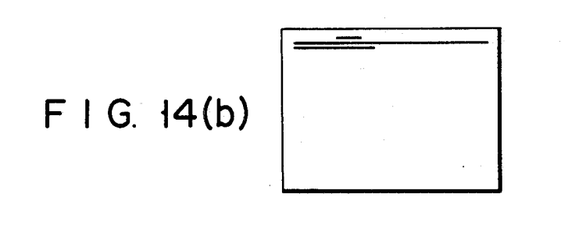

Assume that the switch 122 is operated to change the sheet size from the size II to the size I. In this case, the CPU 13 checks, in step D11, whether or not the switch 120, for determining the column number, i.e., the character number for one line, is set in the "20" position. If YES in step D11, value "14", representing 14 characters, is stored in the register 145 in step D13. This indicates that only 14 characters are printed for the size II, while 20 characters are printed for the size I. However, if NO in step D11, i.e., when the CPU 13 determines that "40", representing 40 characters, is set, the flow advances to step D12. Value "28", representing 28 characters, is stored in the register 145. This indicates that only 28 characters are printed for the size II, while 40 characters are printed for the size I. When the flow for determining the number of characters for one line is completed, the flow advances to step D14 wherein column direction decision flow is started. More particularly, the CPU 13 checks, in step D14, whether or not the line number is set at 20. If YES in step D14, the flow advances to step D16, and value "16", representing 14 lines, is stored in the L register 146. However, if NO in step D14, the flow advances to step D15, and "28" is stored in the L register 146 in step D15. This indicates that only 14 lines are printed for the size II while 20 lines can be printed for the size I. Therefore, only 28 lines are printed for size II while 40 lines can be printed for size I. As shown in FIG. 11(a), the selected character number indicates that 20 characters are printed for the size I. In this case, as shown in FIG. 11(b), display dots corresponding to 20 characters flicker on the layout display section 24. When the sheet size II is selected, 14 characters are printed, as shown in FIG. 12(a), and the display dots corresponding to 14 characters flicker as shown in FIG. 12(b). In the above embodiment, a case is given wherein the character pitch is left unchanged while the sheet size is changed, thereby showing the printing state of the sheet and the display state of the layout display. When the character and line pitches are changed from the references shown in FIGS. 13(a) and 13(b), the printing state and the display state shown in FIGS. 14(a) and 14(b), respectively, are obtained. In this case, the sheet size is left unchanged. The character number and the line number in FIG. 13(b) are "20", while those in FIG. 14(b) are "40".

What is claimed is:

1. A layout display device of an electronic printer, comprising:
   keyboard means having at least character keys;
   layout display means having a plurality of fixed display segments arranged in a given manner;
   means for setting one of a maximum character number and a maximum line number;
   first memory means coupled to the setting means for storing maximum number data representing said one of said maximum character number and maximum line number;
   means coupled to the keyboard means for determining positions of characters printed on the recording sheet by depression of the character keys;
   second memory means coupled to the character position determining means for storing character position data representing the determined character positons;
   arithmetic means coupled to the first and second memory means for calculating display segment position data such that the ratio of said display segment position data to the total number of said display segments of the layout display means is equal to the ratio of said character position data to said maximum number data; and
   layout display control means coupled between the arithmetic means and the layout display means for displaying the display segments at that position on the layout display section which corresponds to the data of display segment position.

2. A device according to claim 1, wherein said arithmetic means comprises means for calculating $$Y = (T/MAX) \times (X)$$

where Y is data of a display segment position, T is data of total number of the display segments, MAX is maximum number data and X is character position data.

3. A device according to claim 1, wherein said layout display means comprises a layout display section having a plurality of fixed display segments arranged in one line, said setting means comprises means for setting a maximum character number indicative of a maximum number of characters to be printed for one line, and said arithmetic means comprises means for calculating $$Y = (T/MAX) \times (X)$$

wherein Y is data of a display segment position, T is data of the total number of the display segments of said layout display section, MAX is maximum number data representing said maximum character number, and X is character position data.

4. A device according to claim 1, wherein said layout display means comprises a layout display section having a plurality of fixed display segments arranged in matrix form, said setting means comprises means for setting a maximum character number indicative of a maximum number of characters to be printed for one line and the maximum line number indicative of a maximum number of lines on one page on which characters are printed;
said arithmetic means comprises means for calculating $$Y = (T/C) \times (X),$$

$$y = t/L \times (x)$$

wherein Y is data of a display segment position for one line, T is data of the total number of display segments for one line of said layout display section, C is maximum number data representing said maximum character number, X is character position data representing a column position on one page, y is data of a display segment position for one column, t is data of the total number of display segments for one column of said layout display section, L is maximum number data representing said maximum line number, and x is character position data representing a row position on one page; and
said layout display control means comprises means for energizing said fixed display segments at a matrix position on said layout display section, which is determined by said Y data and said y data.

* * * * *